United States Patent [19]
Buell

[11] 3,860,702

[45] Jan. 14, 1975

[54] ANTI-INFLAMMATORY COMPOSITIONS

[75] Inventor: Eugene F. Buell, Gibsonia, Richland Township, Allegheny Cty., Pa.

[73] Assignee: Schuyler Development Corporation, Reading, Pa.

[22] Filed: July 11, 1972

[21] Appl. No.: 270,714

[52] U.S. Cl. ................................. 424/94, 424/365
[51] Int. Cl. ............................................ A61k 27/00
[58] Field of Search ............................. 424/94, 365

[56] References Cited
UNITED STATES PATENTS 3,003,917  10/1961  Beiler et al. ......................... 424/94

Primary Examiner—Sam Rosen
Attorney, Agent, or Firm—Buell, Blenko and Ziesenheim

[57] ABSTRACT

An anti-inflammatory composition is provided which comprises a proteolytic enzyme in a partially hydrolized cocoa butter.

7 Claims, No Drawings

ANTI-INFLAMMATORY COMPOSITIONS

This invention relates to anti-inflammatory compositions and particularly to a topical preparation for the treatment of inflammations in subdermal tissue.

The function of the proteolytic enzymes in the digestion of proteins is well known, their action being to split proteins into amino acids and peptides. They have long been administered for digestive purposes and they have been in more recent years demonstrated to be effective theraputics in reducing inflammation and edema when properly administered. Among the proteolytic enzymes which have been used in this fashion are trypsin and chymotrypsin which are derived from the pancreas, papain which is derived from the juice of the papaya roots and other such known enzymes. The theory of the effectiveness of these proteolytic enzymes is generally that they function as a depolymerase at the site of the inflammation to reverse the fibrinogen-fibrin reaction responsible for the imflammation. It is theorized that as the porosity of the protein network wall is increased the intercellular fluid is released, hydrostatic pressures are reduced, capillaries are opened and circulation in the local area is restored. Thus the anti-inflammatory reaction of the proteolytic enzyme is a direct result of its facilitating drainage from the inflamed area by lysis of fibrin plugs in the lymphatics and capillaries about the inflammatory lesion. The well known proteolytic enzymes such as trypsin and chymotrypsin are active both by local and parenteral administration.

It is well known that the proteolytic enzymes can be administered intra-muscularly and are effective in reducing inflammation. It is also known that they can be introduced by the buccal route and that they can be orally administered in enteric coated tablets. It is generally assumed and basically has been proven that the molecular size of the proteolytic enzymes was so large as to prevent its absorption through the skin.

The present invention is based on the discovery that the proteolytic enzymes can be absorbed through the dermis and epidermis if they are carried in a carrier made up of partially hydrolized cocoa butter. By partially hydrolized cocoa butter I mean cocoa butter which has been first partially converted to a soap by reacting the natural cocoa butter with an alkali such as sodium hydroxide or potassium hydroxide in an amount insufficient to react with all of the cocoa butter so that a part of the cocoa butter is not converted to soap and then treating the soap with a mineral acid such as hydrochloric acid in an amount sufficient to react with the soaps to form free fatty acids from that portion of the cocoa butter which had been converted to a soap. The resulting product is made up partly of free fatty acids converted from the cocoa butter and partially of unreacted cocoa butter. Preferably I retain between 5 and 50 percent of the cocoa butter in the unreacted state so that when I speak of partially hydrolized cocoa butter I mean any cocoa butter product containing from 5 to 50 percent unreacted cocoa butter and the balance free fatty acids of the natural cocoa butter. The hydrolysis reactions by which the cocoa butter is first preferably converted to soaps and then to free fatty acids are well known. They are the same reactions by which soaps and free fatty acids have been historically made from natural fats and oils. The difference lies simply in the fact that in the present instance I prefer an incomplete reaction rather than a complete hydrolysis as is generally carried out in soap making and in the manufacture of free fatty acids. I have found that by suspending the proteolytic enzyme in the partially hydrolized cocoa butter that the cocoa butter and the proteolytic enzyme appear to be effective in markedly increasing tissue permeability and causing the proteolytic enzyme to pass through the dermas and epidermas into the inflamed tissue by mere surface application. The amount of proteolytic enzyme is not particularly critical in respect to the amount of partially hydrolized cocoa butter. It is simply necessary that there be enough of cocoa butter present to properly suspend and carry the proteolytic enzyme. Preferably I use from about 1 gram of proteolytic enzyme to 50 grams of proteolytic enzyme in 250 grams of the partially hydrolized cocoa butter. This is preferably applied to the skin of the inflamed area in amounts of about 2 to 5 grams of the mixture per application and rubbed into the skin with the fingers.

Following are specific working examples showing compositions which are used as well as the methods of manufacture.

EXAMPLE I 50 grams of crystalline trypsin are placed in a Waring Blender along with 250 grams of partially hydrolized cocoa butter containing 10 percent unreacted cocoa butter. The partially hydrolized cocoa butter free fatty acids are produced as above described. The mixture was stirred for 5 minutes in the Waring Blender to produce a creamy substance which is applied directly to the surface skin above the inflamed area.

EXAMPLE II 50 grams of crystalline chymotrypsin are added to 250 grams of partially hydrolized cocoa butter containing 25% unreacted cocoa butter as described above. The mixture was placed in a Waring Blender and mixed for 5 minutes to assure complete distribution of the chymotrypsin in the cocoa butter.

EXAMPLE III 25 grams of papain are added to 200 grams of partially hydrolized cocoa butter containing 10 percent unreacted cocoa butter. The mixture was thoroughly mixed for 5 minutes in a Waring Blender so that papain was completely distributed in the cocoa butter. The product is applied to the epidermas above the inflammed area.

EXAMPLE IV

A mixture of proteolytic enzyme concentrate containing about 70% trypsin and 30% chymotrypsin was admixed in the proportion of 50 grams of a mixture to 250 grams of partially hydrolized cocoa butter containing 10 percent unreacted cocoa butter. The mixture was mixed in a Waring Blender for 5 minutes to distribute the proteolytic enzyme through the cocoa butter. The product is a white creamy mixture with a slight cream color. The product is applied and used by simply rubbing into the epidermas above the inflamed area.

It will be recognized that this invention may be otherwise embodied as described in the preferred practices outlined above. However, it will be understood that the practice is fully equivalent to that here set forth and in the specification and in the following claims:

I claim:

1. An anti-inflammatory composition comprising a proteolytic enzyme from the group consisting of trypsin, chymotrypsin, papain and mixtures thereof in an amount effective to reduce inflammation admixed in partially hydrolized cocoa butter being a mixture of cocoa butter fatty acids and cocoa butter containing 5 to 50 percent unreacted cocoa butter.

2. An anti-inflammatory composition as claimed in claim 1 wherein the proteolytic enzyme is trypsin.

3. An anti-inflammatory composition as claimed in claim 1 wherein the proteolytic enzyme is chymotrypsin.

4. An anti-inflammatory composition as claimed in claim 1 wherein the proteolytic enzyme is papain.

5. An anti-inflammatory composition as claimed in claim 1 wherein the proteolytic enzyme is a mixture of trypsin and chymotrypsin.

6. An anti-inflammatory composition as claimed in claim 1 wherein the mixture of cocoa butter fatty acids and cocoa butter contains 10 to 50 percent of unreacted cocoa butter.

7. An anti-inflammatory composition as claimed in claim 1 wherein the proteolytic enzyme is in the proportion of about 0.4 to 20 percent of the mixture of cocoa butter fatty acids and cocoa butter.

* * * * *